(12) United States Patent
Zhang et al.

(10) Patent No.: US 12,003,129 B2
(45) Date of Patent: *Jun. 4, 2024

(54) FIXING APPARATUS OF WIRELESS CHARGER WITH ELASTIC COMPONENT

(71) Applicant: Hubbell Incorporated, Shelton, CT (US)

(72) Inventors: Xiaoxue Zhang, Dongguan (CN); Wensen Chen, Dongguan (CN)

(73) Assignee: Hubbell Incorporated, Shelton, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 18/295,042

(22) Filed: Apr. 3, 2023

(65) Prior Publication Data

US 2023/0246463 A1 Aug. 3, 2023

Related U.S. Application Data

(63) Continuation of application No. 17/055,022, filed as application No. PCT/CN2019/075686 on Feb. 21, 2019, now Pat. No. 11,689,037.

(30) Foreign Application Priority Data

Mar. 15, 2018 (CN) .......................... 201810215123.5

(51) Int. Cl.
*H01M 10/46* (2006.01)
*H02J 7/00* (2006.01)
(Continued)

(52) U.S. Cl.
CPC .......... *H02J 7/0044* (2013.01); *H02J 50/005* (2020.01); *H02J 50/10* (2016.02); *F16B 2/18* (2013.01); *H02J 2310/22* (2020.01)

(58) Field of Classification Search
CPC ...... H02J 7/0044; H02J 7/0042; H02J 50/005; H02J 50/10; H02J 2310/22; F16B 2/18
(Continued)

(56) References Cited

U.S. PATENT DOCUMENTS 11,689,037 B2 * 6/2023 Zhang .................. H02J 50/005
320/107

FOREIGN PATENT DOCUMENTS

CN 102420466 A 4/2012
CN 203466598 U 3/2014
(Continued)

OTHER PUBLICATIONS

International Search Report and Written Opinion dated Apr. 30, 2019, by the National Intellectual Property Administration, PRC in corresponding International Patent Application No. PCT/CN2019/075686. (6 pages).

(Continued)

*Primary Examiner* — Edward Tso
(74) *Attorney, Agent, or Firm* — Robinson & Cole LLP

(57) ABSTRACT

The embodiments of the present disclosure relate to a fixing apparatus of a wireless charger. According to an embodiment, the fixing apparatus of the wireless charger comprises: a first support; a second support opposite to the first support; a third support disposed between the first support and the second support and used to fix a mobile device to the wireless charger; and an elastic component connected to the first support and the second support respectively, wherein the elastic component is configured to enable the fixing apparatus to move between an initial position and a fixed position. The fixing apparatus of the wireless charger provided in the embodiments of the present disclosure have many advantages such as convenient usage, simple production processes, and low production costs, etc.

20 Claims, 4 Drawing Sheets

(51) Int. Cl.
*H02J 50/00* (2016.01)
*H02J 50/10* (2016.01)
*F16B 2/18* (2006.01)

(58) Field of Classification Search
USPC .................................. 320/107, 108, 114, 115
See application file for complete search history.

(56) References Cited

FOREIGN PATENT DOCUMENTS

| | | |
|---|---|---|
| CN | 103840517 A | 6/2014 |
| CN | 103944211 A | 7/2014 |
| CN | 203774820 U | 8/2014 |
| CN | 203788012 U | 8/2014 |
| CN | 203896019 U | 10/2014 |
| CN | 204272221 U | 4/2015 |
| CN | 204304575 U | 4/2015 |
| CN | 205231316 U | 5/2016 |
| CN | 205811674 U | 12/2016 |
| CN | 205812124 U | 12/2016 |
| CN | 106347538 A | 1/2017 |
| CN | 206018168 U | 3/2017 |
| CN | 206349817 U | 7/2017 |
| CN | 107124018 A | 9/2017 |
| CN | 107349525 A | 11/2017 |
| CN | 206650457 U | 11/2017 |
| CN | 206770891 U | 12/2017 |
| KR | 2015-0136867 A | 12/2015 |

OTHER PUBLICATIONS

English translation of CN107124018. (5 pages).

\* cited by examiner

FIXING APPARATUS OF WIRELESS CHARGER WITH ELASTIC COMPONENT

CROSS-REFERENCE TO RELATED APPLICATION

This application is a continuation of U.S. patent application Ser. No. 17/055,022, filed Nov. 12, 2020, which is a 371 of International Patent Application No. PCT/CN2019/075686, filed on Feb. 21, 2019, which claims benefit to Chinese Patent Application No. 201810215123.5, filed on Mar. 15, 2018, the entire contents of each are incorporated by reference.

TECHNICAL FIELD

The embodiments of the present disclosure relate to the field of mobile device accessories, and in particular, to a fixing apparatus of a wireless charger.

BACKGROUND

As wireless charging technologies rapidly develop, more wireless chargers are used. However, the prior art does not pay enough attention to an apparatus for fixing a mobile device (for example, a mobile phone) to the wireless charger. Most users find a variety of inconveniences when using the wireless chargers to charge the mobile device. For example, it is difficult to stably fix the mobile device to the wireless charger. In addition, a user may further hope that the fixing apparatus of the wireless charger is applicable to the mobile devices having multiple different sizes.

Therefore, for the fixing apparatus of the wireless charger, many technical problems still need to be urgently resolved in the art.

SUMMARY

An objective of the embodiments of the present disclosure is to provide a fixing apparatus of a wireless charger, which can stably fix the mobile device to the wireless charger.

An embodiment of the present disclosure provides the fixing apparatus of the wireless charger, comprising: a first support; a second support opposite to the first support; a third support disposed between the first support and the second support and used to fix a mobile device to the wireless charger; and an elastic component connected to the first support and the second support respectively, where the elastic component is configured to enable the fixing apparatus to move between an initial position and a fixed position.

According to an embodiment of the present disclosure, when the fixing apparatus is at the initial position, a first surface of the third support is adjacent to a base of the wireless charger, and when the fixing apparatus moves to the fixed position, a second surface of the third support opposite to the first surface abuts against the mobile device to fix the mobile device to the wireless charger. According to another embodiment of the present disclosure, the elastic component is configured to enable the fixing apparatus to automatically move to the fixed position after counterclockwise rotating more than about 180 degrees from the initial position. According to an embodiment of the present disclosure, the elastic component is configured to enable the fixing apparatus to automatically return to the initial position after clockwise rotating from the fixed position to a position substantially lower than a horizontal plane. According to another embodiment of the present disclosure, an outer side surface of the first support and an outer side surface of the second support are respectively provided with a protrusion component. According to an embodiment of the present disclosure, the second surface of the third support is provided with at least one buffer component. According to another embodiment of the present disclosure, the elastic component includes two torsion springs, the first end of the two torsion springs are configured to respectively be connected to an end portion of the first support and an end portion of the second support, and the second end of the two torsion springs are configured to be connected to the base of the wireless charger. According to an embodiment of the present disclosure, the fixing apparatus is configured to be fixed to the base of the wireless charger in insertion manner or by a fastening component. According to another embodiment of the present disclosure, the first support, the second support, and the third support are formed in one-piece by using metal material or nonmetal material. According to an embodiment of the present disclosure, the fixing apparatus further comprises a slot defined by the first support, the second support, and the third support, and when the fixing apparatus is at the fixed position, the slot exposes an identifier or an image on the wireless charger.

The fixing apparatus of the wireless charger provided in the embodiments of the present disclosure can stably fix the mobile device to the wireless charger, and have many advantages such as convenient usage, simple structures, and low production costs.

DETAILED DESCRIPTIONS

Figure 1:
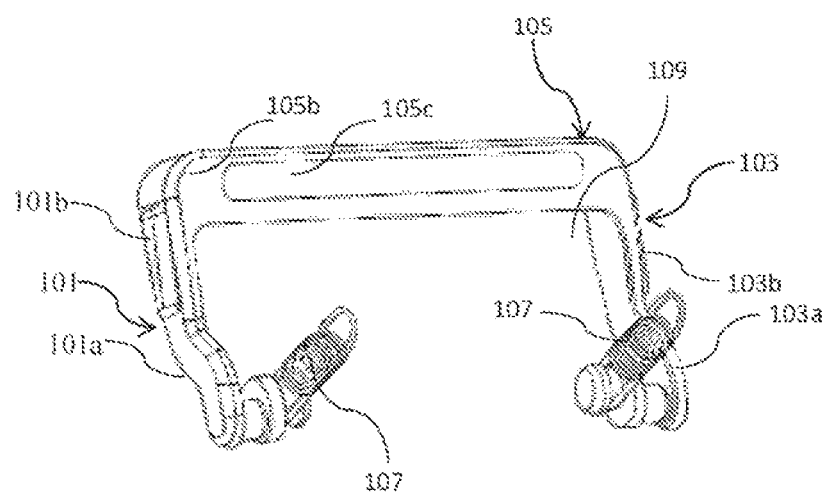
FIG. 1 is a schematic diagram of a fixing apparatus of a wireless charger according to an embodiment of the present disclosure.

The embodiments of the present disclosure provide many different embodiments or examples used to implement different features of the embodiments of the present disclosure. The following describes specific examples of components and arrangements to simplify the embodiments of the present disclosure. Certainly, these are only examples and are not for limitation purposes. For example, in the following descriptions, that a first feature is formed above or on a second feature may include an embodiment in which the first feature and the second feature that are in direct contact are formed, and may also include an embodiment in which an extra feature may be formed between the first feature and the second feature so that the first feature and the second feature may be not in direct contact. In addition, in the embodiments of the present disclosure, reference numerals and/or signs of components may be repeated in various examples. This repetition is for simplification and clarity purposes and does not indicate a relationship between various discussed embodiments and/or configurations.

In addition, for ease of description, relative spatial terms (for example, "top", "bottom", "below", "under", "lower", "upper", "above", and similar terms) may be used to describe a relationship between a component or a feature and another (several) component or another (several) feature in this specification, as shown in the figures. Relative spatial terms further intend to cover different orientations in usage or operation of the apparatus in addition to orientations shown in the figures. A device may use other orientations (rotate by 90 degrees or according to another orientation) and relative spatial description terms used in this specification may be further interpreted on this basis.

Terms "approximately", "generally", "substantially", and "about" used in this specification are used to describe small changes. When the terms are used in combination with events or cases, the terms may indicate precise examples of the events or cases and extremely similar examples of the events or cases. For example, when the terms are used in combination with values, the terms may indicate a change range less than or equal to +10% of the values, for example, less than or equal to +5%, less than or equal to +4%, less than or equal to +3%, less than or equal to +2%, less than or equal to +1%, less than or equal to +0.5%, less than or equal to +0.1%, or less than or equal to +0.05%. For example, if a difference between two values is less than or equal to +10% of an average value of the values, (for example, less than or equal to +5%, less than or equal to +4%, less than or equal to +3%, less than or equal to +2%, less than or equal to +1%, less than or equal to +0.5%, less than or equal to +0.1%, or less than or equal to +0.05%), it may be considered that the two values are "approximately" the same.

In addition, amounts, ratios, and other values are sometimes indicated in a form of a range in this specification. It should be understood that the form of the range is used for convenience and simple purposes and shall be flexibly understood, and includes not only values clearly specified as falling within the range but also all individual values or sub-ranges falling within the range similar to each clearly specified value and sub-range.

In addition, for ease of description, "first", "second", "third", and the like may be used to distinguish different components in one figure or a series of figures in this specification. "First", "second", "third", and the like are not intended to describe corresponding components.

Figure 2:
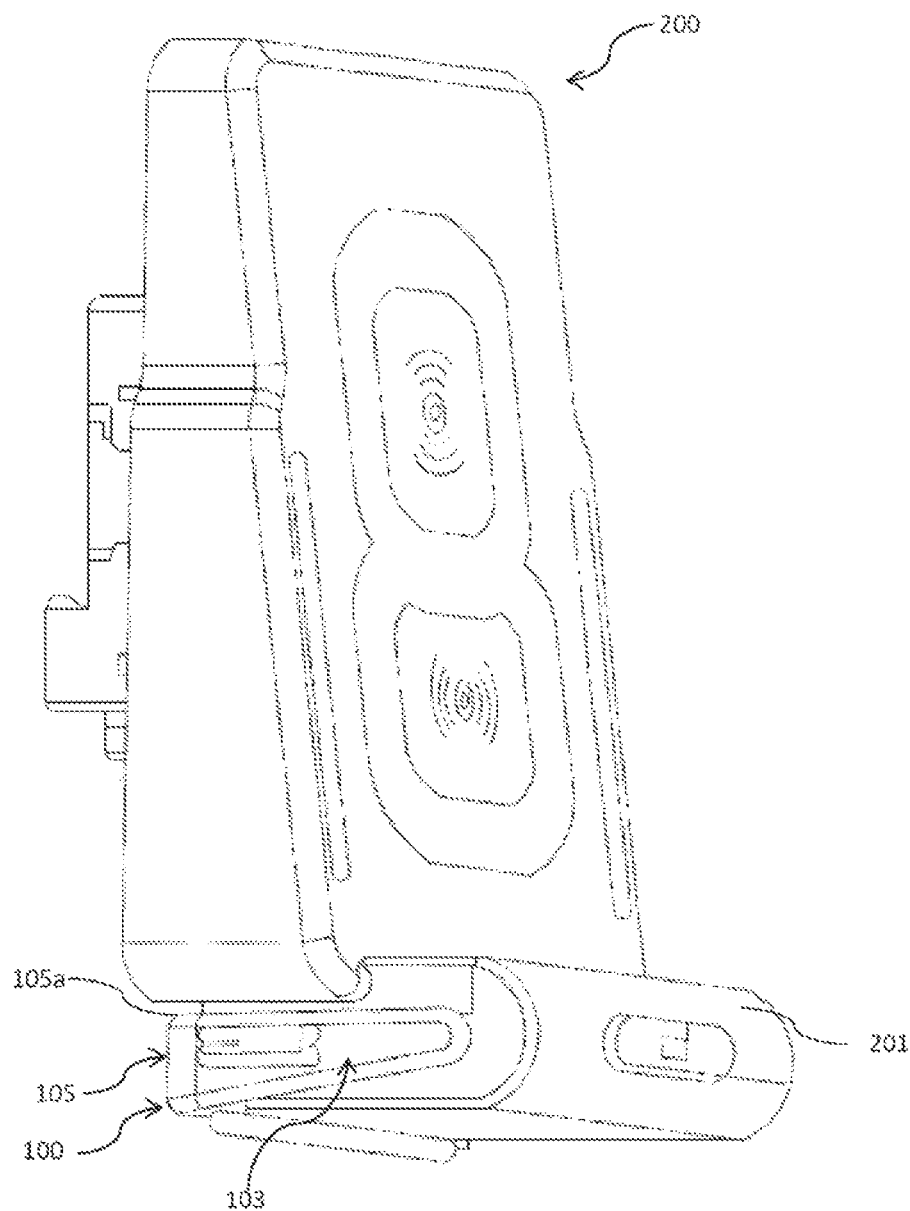
FIG. 2 is a schematic diagram in which a fixing apparatus of a wireless charger is at an initial position according to an embodiment of the present disclosure.
Figure 3:
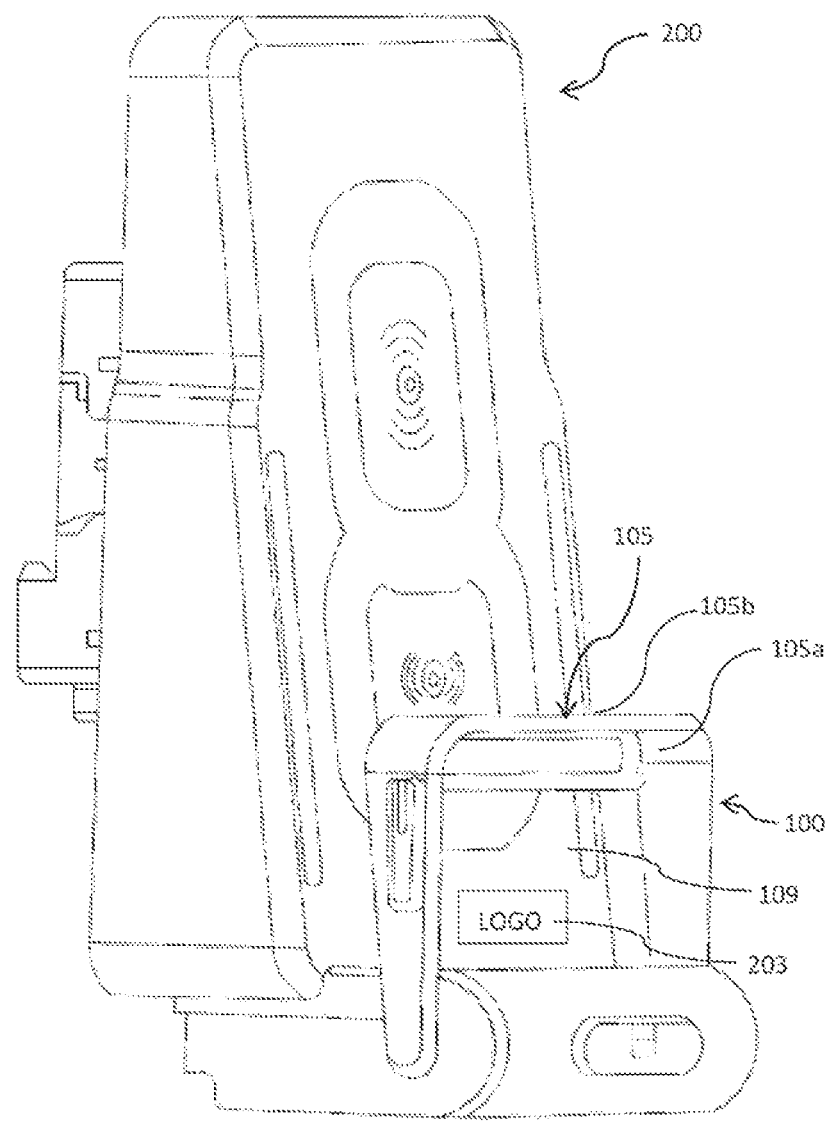
FIG. 3 is a schematic diagram in which a fixing apparatus of a wireless charger is at a fixed position according to an embodiment of the present disclosure.
Figure 4:
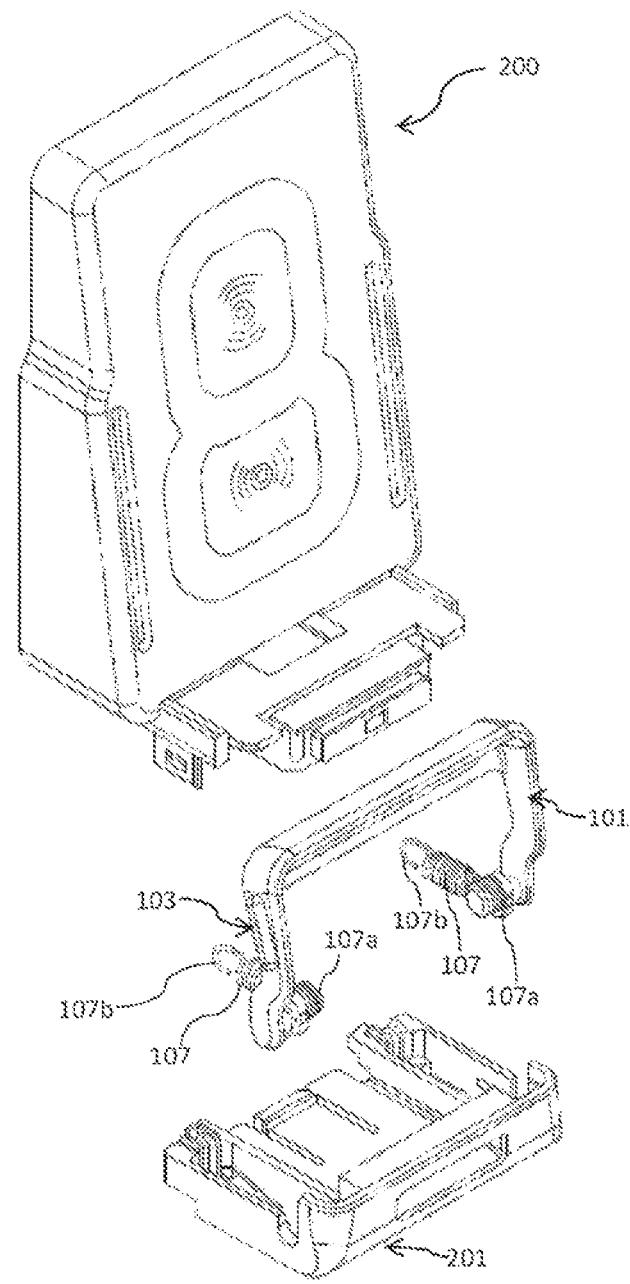
FIG. 4 is an exploded schematic diagram of a fixing apparatus of a wireless charger and a wireless charger according to an embodiment of the present disclosure.

FIG. 1 is a schematic diagram of a fixing apparatus 100 of a wireless charger according to an embodiment of the present disclosure. FIG. 2 is a schematic diagram in which a fixing apparatus 100 of a wireless charger is at an initial position according to an embodiment of the present disclosure. FIG. 3 is a schematic diagram in which a fixing apparatus 100 of a wireless charger is at a fixed position according to an embodiment of the present disclosure. FIG. 4 is an exploded schematic diagram of a fixing apparatus 100 of a wireless charger and a wireless charger 200 according to an embodiment of the present disclosure.

Referring to FIG. 1 to FIG. 3, the fixing apparatus 100 of the wireless charger includes a first support 101, a second support 103, a third support 105, and an elastic component 107, where the first support 101 is opposite to the second support 103.

According to an embodiment of the present disclosure, an outer side surface 101a of the first support 101 and an outer side surface 103a of the second support 103 may be respectively provided with a protrusion component 101b and a protrusion component 103b. The protrusion component 101b and the protrusion component 103b facilitate a user to hold the fixing apparatus 100 of the wireless charger. The protrusion component 101b and the protrusion component 103b may be any shapes, such as, but not limited to, an ellipse, a long strip, or a circle. Moreover, the protrusion component 101b and the protrusion component 103b may be integrally formed with the first support 101, the second support 103, and the third support 105.

The third support 105 is provided between the first support 101 and the second support 103, and is used to fix the mobile device (not shown in the drawings) to the wireless charger 200. When the fixing apparatus 100 is at an initial position shown in FIG. 2, a first surface 105a of the third support 105 is adjacent to a base 201 of the wireless charger 200. When the fixing apparatus 100 rotates to a fixed position shown in FIG. 3, the second surface 105b the third support 105 opposite to the first surface 105a abuts against the mobile device (not shown in the figure) to fix the mobile device to the wireless charger 200.

According to an embodiment of the present disclosure, referring to FIG. 1, the second surface 105b of the third support 105 may be provided with at least one buffer component 105c. The at least one buffer component 105c may prevent the fixing apparatus 100 from damaging, for example, scratching, the surface of the mobile device. The at least one buffer component 105c may be any shape, such as, but not limited to, an ellipse, a long strip, or a circle, etc. Moreover, the at least one buffer component 105c may be made of any common material having a buffer function in the art, for example, but not limited to, rubber.

According to another embodiment of the present disclosure, the first support 101, the second support 103, and the third support 105 are formed in one-piece by using metal material or non-metal material.

According to an implementation of the present disclosure, referring to FIG. 1 and FIG. 3, the fixing apparatus 100 may further comprise a slot 109 defined by the first support 101, the second support 103, and the third support 105. As shown in FIG. 3, when the fixing apparatus 100 is at the fixed position, the slot 109 may expose an identifier or an image 203 on the wireless charger 200.

In the embodiments of the present disclosure, the elastic component may be any apparatus that can enable the fixing apparatus to move between the initial position and the fixed position, for example, but not limited to, a spring, a torsion spring, an elastic wire, an elastic cord, or an elastic band, etc. According to an embodiment of the present disclosure, the elastic component 107 may be two torsion springs. Referring to FIG. 1 and FIG. 4, the two torsion springs are connected to the first support 101 and the second support 103 respectively. The two torsion springs are configured to enable the fixing apparatus 100 to move between the initial position and the fixed position. The first ends 107a of the two torsion springs are configured to respectively be connected to an end portion of the first support 101 and an end portion of the second support 103, and the second ends 107b of the two torsion springs 107a are configured to be connected to the base 201 of the wireless charger 200.

When a user needs to fix the mobile device to the wireless charger 200, the user may hold the protrusion component 101b and the protrusion component 103b, and rotate the fixing apparatus 100 counterclockwise. After the elastic component 107 rotates counterclockwise more than about 180 degrees from the initial position shown in FIG. 2, the elastic component 107 may automatically continue to rotate counterclockwise without holding by the user, until the mobile device is fixed to the wireless charger 200.

The fixing apparatus 100 of the embodiments of the present disclosure is applicable to mobile devices having various different thicknesses. For example, when the fixing apparatus 100 rotates counterclockwise about 260 degrees, the mobile device having a corresponding thickness may be fixed to the wireless charger 200. Alternatively, when the fixing apparatus 100 rotates counterclockwise about 290 degrees, the mobile device having a corresponding thickness may be fixed to the wireless charger 200. Generally, when the fixing apparatus 100 rotates counterclockwise about 260 to 290 degrees, the mobile devices having different corresponding thicknesses may be fixed to the wireless charger 200. Alternatively, when the mobile device is not placed on the wireless charger 200 in advance, after rotating counterclockwise more than about 180 degrees from the initial position shown in FIG. 2, the fixing apparatus 100 may directly stick with the wireless charger 200 automatically without damaging the wireless charger 200.

When a user needs to remove the mobile device from the wireless charger 200, the user only needs to clockwise pull the protrusion component 101*b* and the protrusion component 103*b*, the mobile device is easily removed. In addition, when a user clockwise rotates the fixing apparatus 100 to a position approximately lower than a horizontal plane, the fixing apparatus 100 will automatically returns to the initial position shown in FIG. 2.

As shown in FIG. 4, the fixing apparatus 100 is configured to be fixed to the base 201 of the wireless charger 200 in insertion manner. In other embodiments of the present disclosure, the fixing apparatus 100 may also be fixed to the base 201 of the wireless charger 200 by fastening with a fastening component common in the art or in other common fixing manners.

The fixing apparatus of the wireless charger 100 provided in the embodiments of the present disclosure can stably fix the mobile devices having different thicknesses to the wireless charger without damaging the surface of the mobile device. In addition, support portions of the fixing apparatus 100 of the wireless charger provided in the embodiments of the present disclosure may be made of any metal or non-metal material, and have advantages of simple structures, low costs, and easy production. Moreover, when a user needs to fix the mobile device to the fixing apparatus 100, the user only needs to rotate counterclockwise the fixing apparatus 100, the mobile device can be to stably fixed. When the user needs to remove the mobile device from the fixing apparatus 100, the user only needs to rotate clockwise the fixing apparatus 100, the mobile device can be easily removed, and the fixing apparatus 100 will not cause any damage the mobile device. Therefore, the fixing apparatus 100 of the wireless charger provided in the embodiments of the present disclosure have many advantages such as convenient usage, simple operations, and a long service life, etc.

The foregoing already summarizes features of several embodiments so that persons skilled in the art can better understand the aspects of the embodiments of the present disclosure. Persons skilled in the art shall understand that they may readily design or modify other processes and structures used to implement same objectives and/or same advantages as that of the embodiments of this specification based on the embodiments of the present disclosure. Persons skilled in the art shall recognize that such equivalent constructions shall not depart from the spirit and scope of the embodiments of the present disclosure, and may make various changes, replacements, and modifications on this specification without departing from the spirit and scope of the embodiments of the present disclosure.

What is claimed is:

1. A wireless charger comprising:
a fixing apparatus,
the fixing apparatus including:
a first support;
a second support opposite to the first support;
a third support, provided between the first support and the second support and used to fix a mobile device to the wireless charger; and
at least one elastic component connected to the first support or the second support, wherein the elastic component is configured to enable the first support, the second support and the third support to move between an initial position and a fixed position.

2. The wireless charger according to claim 1,
wherein when the fixing apparatus is at the initial position, a first surface of the third support is adjacent to a base of the wireless charger, and
wherein when the fixing apparatus moves to the fixed position, a second surface of the third support opposite to the first surface abuts against the mobile device to fix the mobile device to the wireless charger.

3. The wireless charger according to claim 2,
wherein the second surface of the third support is provided with at least one buffer component.

4. The wireless charger according to claim 1,
wherein the elastic component is configured to enable the fixing apparatus to automatically move to the fixed position after counterclockwise rotating more than about 180 degrees from the initial position.

5. The wireless charger according to claim 1,
wherein the at least one elastic component is configured to enable the fixing apparatus to automatically return to the initial position after clockwise rotating from the fixed position to a position substantially lower than a horizontal plane.

6. The wireless charger according to claim 1,
wherein an outer side surface of the first support and an outer side surface of the second support are respectively provided with a protrusion component.

7. The wireless charger according to claim 1, further comprising:
a base,
wherein the at least one elastic component comprises two torsion springs,
wherein the first end of the two torsion springs are configured to respectively be connected to an end portion of the first support and an end portion of the second support, and
wherein the second end of the two torsion springs are configured to be connected to the base.

8. The wireless charger according to claim 1, further comprising:
a base,
wherein the fixing apparatus is configured to be fixed to the base in an insertion manner or by a fastening component.

9. The wireless charger according to claim 1,
wherein the first support, the second support, and the third support are formed together as a single monolithic piece.

10. The wireless charger according to claim 1, further comprising:
an identifier or an image,
wherein the fixing apparatus further includes a slot defined by the first support, the second support, and the third support, and wherein when the fixing apparatus is at the fixed position, the slot exposes the identifier or the image between the first and third supports.

11. The wireless charger according to claim 1,
wherein the first, second and third supports are configured to be fixed relative to one another when the first, second and third supports move between the initial position and the fixed position.

12. The wireless charger according to claim 1, further comprising:
a front support surface,
wherein when the fixing apparatus moves to the fixed position, a surface of the third support opposite to the first surface abuts against the mobile device to fix the mobile device between the front support surface and the surface of the third support.

13. A method of fixing a mobile device to a wireless charger, the wireless charger comprising a fixing apparatus that includes a first support, a second support opposite to the first support, and a third support between the first support and the second support, the fixing apparatus further including at least one elastic component connected to the first support or the second support, the method comprising:
positioning the mobile device against the wireless charger; and
using an elastic component of the fixing apparatus to move the first support, the second support and the third support between an initial position and a fixed position, wherein the mobile device is fixed to the wireless charger by the third support in the fixed position.

14. The method according to claim 13,
wherein when the fixing apparatus is at the initial position, a first surface of the third support is adjacent to a base of the wireless charger, and
wherein when the fixing apparatus moves to the fixed position, a second surface of the third support opposite to the first surface abuts against the mobile device to fix the mobile device to the wireless charger.

15. The method according to claim 14,
wherein the second surface of the third support is provided with at least one buffer component.

16. The method according to claim 13,
wherein the elastic component enables the fixing apparatus to automatically move to the fixed position after counterclockwise rotating more than about 180 degrees from the initial position.

17. The method according to claim 13,
wherein the at least one elastic component enables the fixing apparatus to automatically return to the initial position after clockwise rotating from the fixed position to a position substantially lower than a horizontal plane.

18. The method according to claim 13,
wherein the wireless charger further includes a base, the at least one elastic component comprises two torsion springs, the first end of the two torsion springs are respectively connected to an end portion of the first support and an end portion of the second support, and the second end of the two torsion springs are connected to the base.

19. The method according to claim 13, wherein the fixing apparatus further includes a slot defined by the first support, the second support, and the third support, the method further comprising:
exposing, through the slot, an identifier or an image on the wireless charger when the fixing apparatus is at the fixed position.

20. The method according to claim 13,
wherein the first, second and third supports are fixed relative to one another when the first, second and third supports move between the initial position and the fixed position.

* * * * *